United States Patent
Darcy, III et al.

(10) Patent No.: US 7,410,548 B2
(45) Date of Patent: Aug. 12, 2008

(54) FLEXIBLE IMAGING MEMBER BELT SEAM SMOOTHING METHOD

(75) Inventors: John J. Darcy, III, Webster, NY (US); Michael S. Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 399 days.

(21) Appl. No.: 11/211,752

(22) Filed: Aug. 26, 2005

(65) Prior Publication Data
US 2007/0044892 A1    Mar. 1, 2007

(51) Int. Cl.
  G03G 5/00   (2006.01)
  B32B 37/00  (2006.01)
(52) U.S. Cl. .................. 156/73.4; 156/154; 430/133
(58) Field of Classification Search .............. 430/133; 156/73.4, 154
See application file for complete search history.

(56) References Cited

U.S. PATENT DOCUMENTS

| | | | |
|---|---|---|---|
| 3,988,399 A | 10/1976 | Evans | |
| 4,265,990 A | 5/1981 | Stolka et al. | |
| 4,532,166 A | 7/1985 | Thomsen et al. | |
| 4,786,570 A | 11/1988 | Yu et al. | |
| 4,840,873 A | 6/1989 | Kobayashi et al. | |
| 4,937,117 A | 6/1990 | Yu | |
| 5,021,109 A | 6/1991 | Petropoulos et al. | |
| 5,021,309 A | 6/1991 | Yu | |
| 5,240,532 A | 8/1993 | Yu | |
| 5,376,491 A | 12/1994 | Krumberg et al. | |
| 5,552,005 A | 9/1996 | Mammino et al. | |
| 5,603,790 A | 2/1997 | Rhodes | |
| 5,698,358 A * | 12/1997 | Yu | 430/127 |
| 6,056,839 A | 5/2000 | Yu et al. | |
| 6,074,504 A | 6/2000 | Yu et al. | |
| 6,652,691 B1 | 11/2003 | Yu et al. | |
| 2002/0008332 A1 | 1/2002 | Mishra et al. | |
| 2004/0221942 A1 | 11/2004 | Yu et al. | |
| 2004/0221943 A1 | 11/2004 | Yu et al. | |
| 2006/0071048 A1 * | 4/2006 | Yu et al. | 228/1.1 |

* cited by examiner

*Primary Examiner*—John L Goodrow
(74) *Attorney, Agent, or Firm*—Oliff & Berridge, PLC

(57) ABSTRACT

Post treatment of an ultrasonically welded seamed flexible imaging member belt includes providing a flexible belt having an outer surface, an inner surface, parallel edges and a welded seam extending from one parallel edge to the other parallel edge, the belt seam including a seam region comprising an overlap of two oppositely miter cut edges, and two adjacent splashing formed around the seam; contacting the seam with abrasive and a super finishing tool; and super finishing the seam to remove at least the splashing on the outer surface of the belt.

23 Claims, 6 Drawing Sheets

FLEXIBLE IMAGING MEMBER BELT SEAM SMOOTHING METHOD

TECHNICAL FIELD

This disclosure is generally directed to a seam surface treatment system and method. More specifically, this disclosure is directed to a post ultrasonically welded seam treatment system and method for flexible imaging member belts.

BACKGROUND

Flexible electrostatographic belt imaging members are well known in the art. Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems. These belts are usually formed by cutting a rectangular sheet from a web containing at least one layer of thermoplastic polymeric material, overlapping opposite ends of the sheet, and joining the overlapped ends together to form a welded seam. The seam extends from one edge of the belt to the opposite edge. Generally, these belts comprise at least a supporting substrate layer and at least one imaging layer comprising thermoplastic polymeric matrix material. The "imaging layer" as employed herein is defined as the dielectric imaging layer of an electroreceptor belt, the transfer layer of an intermediate transfer belt and, the charge transport layer of an electrophotographic belt. Thus, the thermoplastic polymeric matrix material in the imaging layer is located in the upper portion of a cross section of an electrostatographic imaging member belt, the substrate layer being in the lower portion of the cross section of the electrostatographic imaging member belt. Although the flexible belts of interest include the mentioned types, for simplicity reasons, the discussion hereinafter will be focus on the electrophotographic imaging member belts.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A typical layered photoreceptor having separate charge generating (photogenerating) and charge transport layers is described in U.S. Pat. No. 4,265,990, the entire disclosure thereof being incorporated herein by reference. The charge generating layer is capable of photogenerating holes and injecting the photogenerated holes into the charge transport layer.

Although excellent toner images may be obtained with multilayered belt photoreceptors, it has been found that as more advanced, higher speed electrophotographic copiers, duplicators and printers were developed, fatigue induced cracking of the charge transport layer at the welded seam area is frequently encountered during photoreceptor belt cycling. Moreover, the onset of seam cracking has also been found to rapidly lead to seam delamination due to fatigue thereby shortening belt service life. Dynamic fatigue seam cracking may possibly happen in ionographic imaging member belts as well.

The flexible electrostatographic imaging member belts are fabricated from a sheet cut from an imaging member web. The sheets are generally rectangular or in the shape of a parallelogram where the seam does not form a right angle to the parallel sides of the sheet. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. Ultrasonic welding is generally the preferred method of joining because it is rapid, clean (no solvents) and produces a thin and narrow seam. In addition, ultrasonic welding is preferred because the mechanical pounding of the welding horn causes generation of heat at the contiguous overlapping end marginal regions of the sheet to maximize melting of one or more layers therein. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

When ultrasonically welded into a belt, the seam of multilayered electrophotographic imaging flexible member belts may occasionally contain undesirable high protrusions such as peaks, ridges, spikes, and mounds. These seam protrusions present problems during image cycling of the belt machine because they interact with cleaning blades to cause blade wear and tear, which ultimately affect cleaning blade efficiency and service life. Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member. Another frequently observed mechanical failure in the imaging belts during image cycling is that the ultrasonically welded seam of an electrophotographic imaging member belt can also cause initiation of cracks in the seam, which then propagate and lead to delamination after being subjected to extended bending and flexing cycles over small diameter belt support rollers of an imaging machine or when due to lateral forces caused by mechanical rubbing contact against stationary web edge guides of a belt support module during cycling. Seam cracking and delamination has also been found to be further aggravated when the belt is employed in electrophotographic imaging systems utilizing blade cleaning devices and some operational imaging subsystems. Alteration of materials in the various photoreceptor belt layers such as the conductive layer, hole blocking layer, adhesive layer, charge generating layer, and/or charge transport layer to suppress cracking and delamination problems is not easily accomplished. The alteration of the materials may adversely impact the overall physical, electrical, mechanical, and other properties of the belt such as coating layer uniformity, residual voltage, background, dark decay, flexibility, and the like.

For example, when a flexible imaging member belt used in an electrophotographic machine is a photoreceptor belt fabricated by ultrasonic welding of overlapped opposite ends of a sheet, the ultrasonic energy transmitted to the overlapped ends melts the thermoplastic sheet components in the overlap region to form a seam. The ultrasonic welded seam of a multilayered photoreceptor belt is relatively brittle and low in strength and toughness. The joining techniques, particularly the welding process, can result in the formation of a splashing that projects out from either side of the seam in the overlap region of the belt. The overlap region and splashings on each side of the overlap region comprise a strip from one edge of the belt to the other that is referred to herein as the "seam region". Because of the splashing, a typical flexible imaging member belt is about 1.6 times thicker in the seam region than that of the remainder of the belt (e.g., in a typical example, 188 micrometers versus 116 micrometers).

The photoreceptor belt in an electrophotographic imaging apparatus undergoes bending strain as the belt is cycled over a plurality of support and drive rollers. The excessive thickness of the photoreceptor belt in the seam region due to the presence of the splashing results in a large induced bending strain as the seam travels over each roller. Generally, small diameter support rollers are highly desirable for simple, reliable copy paper stripping systems in electrophotographic imaging apparatus utilizing a photoreceptor belt system operating in a very confined space. Unfortunately, small diameter rollers, e.g., less than about 0.75 inch (19 millimeters) in diameter, raise the threshold of mechanical performance criteria to such a high level that photoreceptor belt seam failure can become unacceptable for multilayered belt photoreceptors. For example, when bending over a 19 millimeter diameter roller, a typical photoreceptor belt seam splashing may develop a 0.96 percent tensile strain due to bending. This is 1.63 times greater than a 0.59 percent induced bending strain that develops within the rest of the photoreceptor belt. Therefore, the 0.96 percent tensile strain in the seam splashing region of the belt represents a 63 percent increase in stress placed upon the seam splashing region of the belt.

Under dynamic fatiguing conditions, the seam provides a focal point for stress concentration and becomes the point of crack initiation which is further developed into seam delamination causing premature mechanical failure in the belt. Thus, the splashing tends to shorten the mechanical life of the seam and service life of the flexible member belts used in copiers, duplicators, and printers.

U.S. Patent Publication No. 2002-0008332 A1 discloses a process for post treatment of an ultrasonically welded seamed flexible imaging member belt comprising providing an elongated support member having a smooth flat supporting surface, providing a flexible belt having parallel edges and a welded seam extending from one edge to the other edge, the belt seam comprising a seam region comprising an overlap and two adjacent splashings, thermoplastic polymer material having a glass transition temperature and an inner and outer surface, supporting the inner surface of seam on the smooth flat supporting surface with the seam region of the belt held down against and conforming to the flat supporting surface of the support member, contacting the seam with a heated surface, the contacting heated surface has a profile that is substantially parallel to the smooth flat supporting surface of the support member, heating the seam with the heated surface to raise the temperature in the seam region to a temperature of from about 2° C. to 20° C. above the Tg of the thermoplastic polymer material, and compressing the seam with the heated surface with sufficient compression pressure to smooth out the seam.

U.S. Patent Publication No. 2004-0221943 A1 discloses a process for adhesive bonding of an endless seamed flexible belt, wherein the belt comprises a first end and a second end, each of the first end and the second end comprising a plurality of mutually mating elements which join in an interlocking relationship to form a seam, and the seam comprising an adhesive, the process comprising: a) providing an adhesive strip on a front side of a release substrate to form an adhesive tape, wherein the release substrate comprises a material selected from the group consisting of ethylene chlorotrifluoroethylene, ethylene tetrafluoroethylene, vinyls, siloxane containing polymers, acrylates, polyimines, and mixtures thereof; b) providing the adhesive tape over the seam, wherein the front side of the release substrate containing the adhesive strip is in contact with the seam and mutually mating members; and c) subjecting the adhesive tape to adhesive bonding, wherein the adhesive strip melts and flows between the mutually mating members of the seam. In an embodiment, the seam can be subjected to super finishing.

U.S. Patent Publication No. 2004-0221942 A1 discloses a process for adhesive bonding of a photoreceptor belt, wherein the photoreceptor belt comprises a seam comprising an adhesive, and wherein the photoreceptor comprises a photoreceptor substrate, charge transport layer comprising charge transport materials dispersed therein, and an overcoat layer, the process comprising: a) providing an adhesive strip on a front side of a release substrate to form an adhesive tape, wherein the release substrate comprising a material selected from the group consisting of polypropylene, vinyls, siloxane containing polymers, acrylates, polyimines, and mixtures thereof; b) providing the adhesive tape over the seam, wherein the front side of the release substrate containing the adhesive strip is in contact with the seam and mutually mating members; and c) subjecting the adhesive tape to adhesive bonding, wherein the adhesive strip melts and flows between the mutually mating members of the seam. In an embodiment, the seam can be subjected to super finishing.

The entire disclosures of the above-cited patents and publications are incorporated herein in their entirety by reference.

SUMMARY

Despite these various designs, there is a continuing desire to provide seamed flexible imaging belts with an improved seam morphology that can withstand greater dynamic fatigue conditions thereby extending belt service life. It is also desired, from the imaging member belt production point of view, that effective cutting of unit manufacturing cost of seamed imaging belts can be realized if an innovative post seaming treatment process can be developed to provide the triple improvements of seam region thickness reduction, morphological seam surface smoothing, and elimination of seam protrusions to achieve smooth seams.

It is an object of the present disclosure to provide a process that yields improved electrostatographic imaging member belts having a welded seam that is free of seam protrusions and having a smoother surface morphological profile. For example, the disclosure provides an improved electrostatographic imaging member belt with a reduced seam area thickness.

In an embodiment, the present disclosure provides a process for post treatment of an ultrasonically welded seamed flexible imaging member belt comprising:

providing a flexible belt having an outer surface, an inner surface, parallel edges and a welded seam extending from one parallel edge to the other parallel edge, the belt seam comprising a seam region comprising an overlap of two oppositely miter cut edges, and two adjacent splashings formed around the seam;

contacting the seam with abrasive and a super finishing tool; and super finishing the seam to remove at least the splashing on the outer surface of the belt.

In another embodiment, the present disclosure provides a process for forming a seamed flexible belt, comprising:

providing a flexible belt having an outer surface, an inner surface, a first set of parallel side edges and a second set of parallel side edges; wherein the first set of parallel side edges are oppositely miter cut edges;

abutting and overlapping the oppositely miter cut first set of parallel side edges to form a seam;

ultrasonically welding the seam, forming a welded seam extending between the second set of parallel side edges and adjacent splashings formed around the welded seam;

contacting the seam with abrasive and a super finishing tool; and super finishing the seam to remove at least the splashing on the outer surface of the belt.

Although this disclosure relates to apparatus and process improvements for seamed flexible electrostatographic imaging member belts, the following will focus only on seamed flexible electrophotographic imaging member belts to simplify discussion, although the disclosure is in no way limited thereto.

DETAILED DESCRIPTION OF EXEMPLARY EMBODIMENTS

Figure 1:
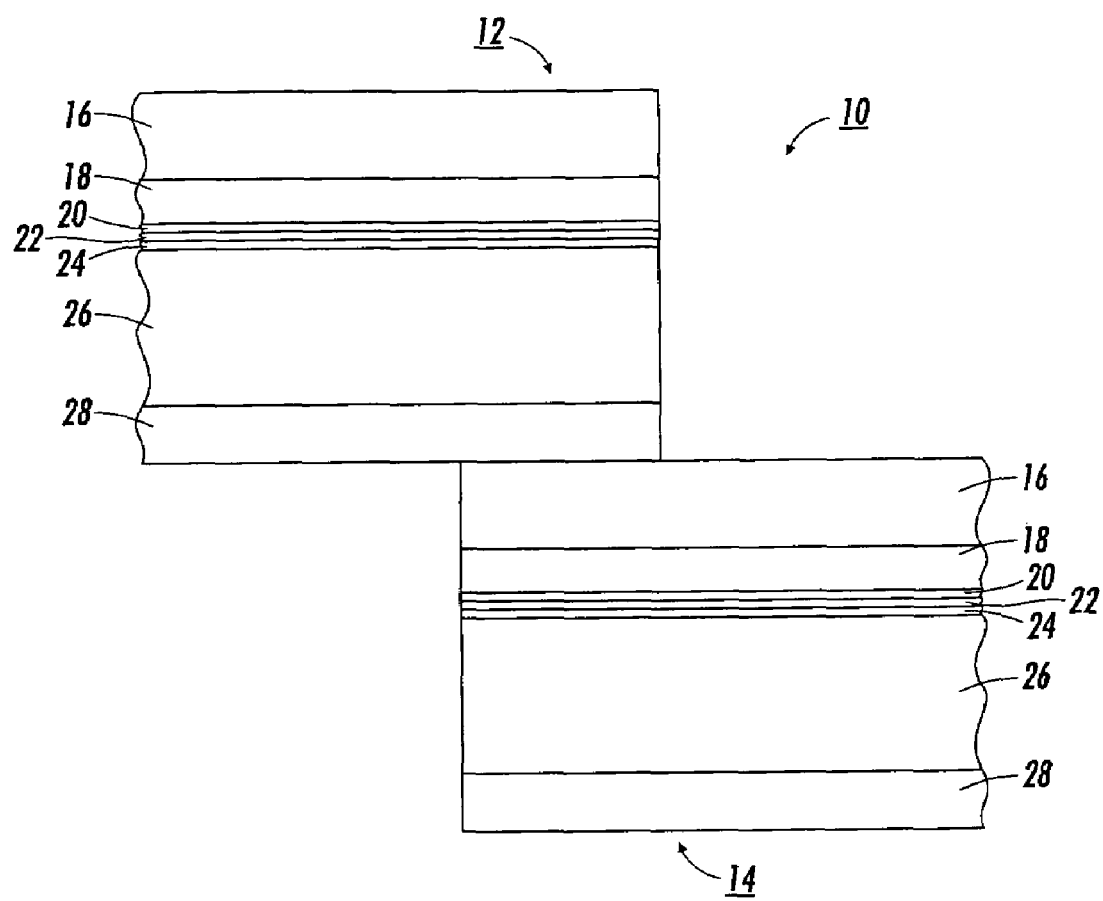
FIG. 1 illustrates a schematic partial cross-sectional view of a multiple layered flexible sheet of electrophotographic imaging member material with opposite ends overlapped.

Although specific terms are used in the following description for the sake of clarity, these terms are intended to refer only to the particular structure of the invention selected for illustration in the drawings, and are not intended to define or limit the scope of the invention.

Referring to FIG. 1, there is illustrated a flexible electrophotographic imaging member 10 in the form of a sheet having a first end marginal region 12 overlapping a second end marginal region 14 to form an overlap region ready for a seam forming operation. The flexible electrophotographic member 10 can be utilized within an electrophotographic imaging device and may be a single film substrate member or a member having a film substrate layer combined with one or more additional coating layers. At least one of the coating layers comprises a film forming binder.

The flexible electrophotographic imaging member 10 may be a single layer or comprise multiple layers. Thus, for example, the flexible belt may be formed as only a single layer, such as a layer of homogenous or substantially homogeneous material, or it can be formed as a multi-layer structure where different adjacent layers have different compositions and/or properties. If the flexible electrophotographic imaging member 10 is to be a negatively charged photoreceptor device, the flexible electrophotographic imaging member 10 may comprise a charge generator layer sandwiched between a conductive surface and a charge transport layer. Alternatively, if the flexible imaging member 10 is to be a positively charged photoreceptor device, the flexible imaging member 10 may comprise a charge transport layer sandwiched between a conductive surface and a charge generator layer.

Thus, in embodiments, the flexible belt is can be a single layer structure. In this embodiment, ultrasonic welding and super finishing can be easily conducted, because the material being polished off in the super finishing process to form the final product is homogeneous throughout the thickness of the belt. That is, the belt does not comprise multiple layers, which may or may not be precisely matched up in the seam area. The super finishing can thus be used to remove the formed splashings, which comprise the belt structure material itself and/or adhesive that may have been placed in the seam area prior to ultrasonic welding, and thereby provide a final product that retains a homogeneous material across the weld area. Of course, embodiments can also include a multi-layer structure as shown in the Figures, where the respective layers in the abutting ends may or may not be precisely aligned. Although precise alignment is desired in some embodiment, it is not necessary. In these embodiments, the super finishing can be used to remove the splashings and provide a smooth surface.

The layers of the flexible electrophotographic imaging member 10 can comprise numerous suitable materials having suitable mechanical properties. Examples of typical layers are described in U.S. Pat. Nos. 4,786,570, 4,937,117, and 5,021,309, the entire disclosures thereof being incorporated herein by reference. The belt of flexible electrophotographic imaging member 10 shown in FIG. 1, including the two end marginal regions 12 and 14, comprises from top to bottom a charge transport layer 16, a generator layer 1, an interface layer 20, a blocking layer 22, a conductive ground plane layer 24, a supporting layer 26, and an anti-curl back coating layer 28. It should be understood that the thickness of the layers are conventional and that a wide range of thicknesses can be used for each of the layers.

Figure 2:
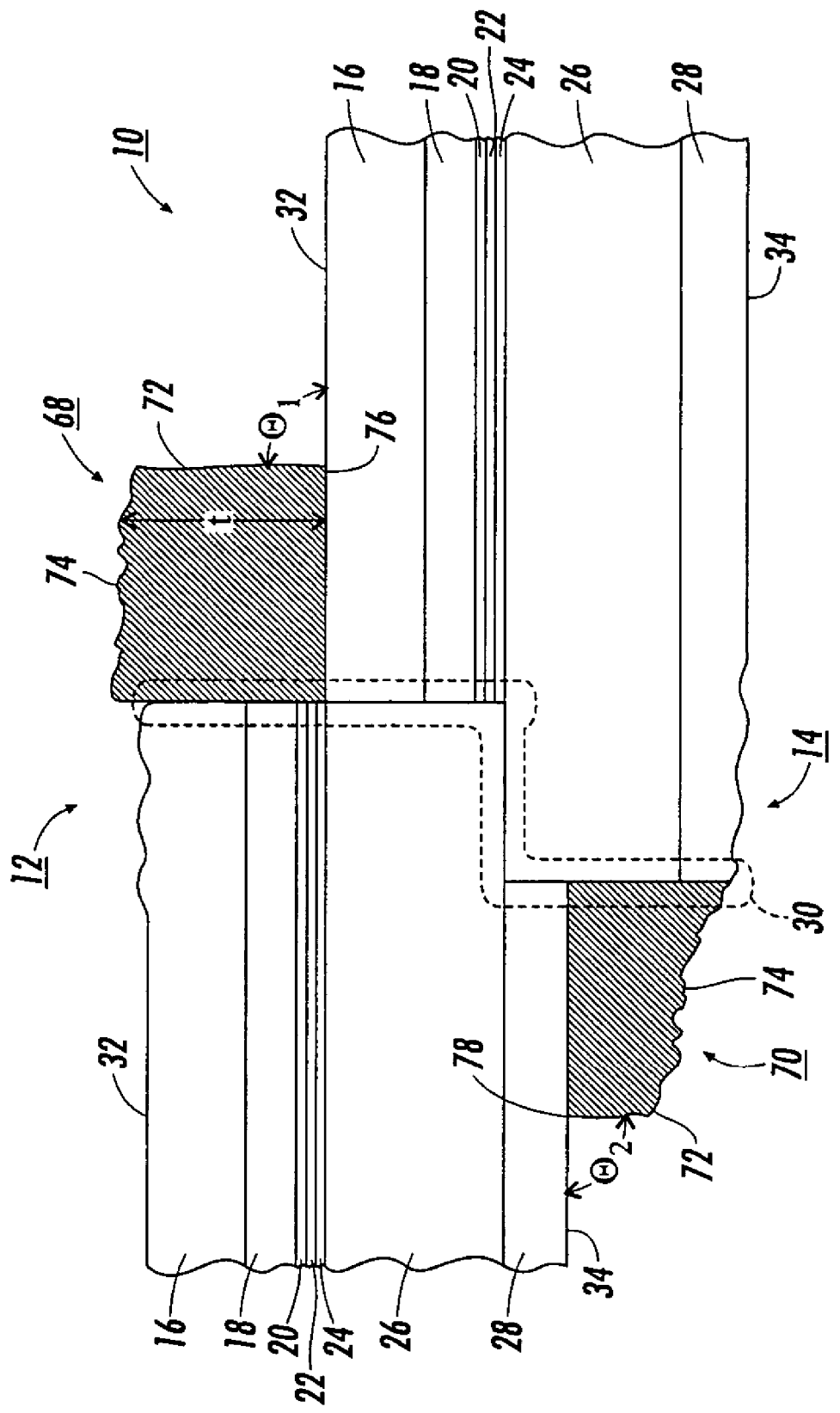
FIG. 2 shows a schematic partial cross-sectional view of a multiple layered seamed flexible electrophotographic imaging member belt derived from the sheet illustrated in FIG. 1 after ultrasonic seam welding.

The end marginal regions 12 and 14 can be joined by any suitable means including gluing, taping, stapling, pressure and heat fusing to form a continuous member such as a belt, sleeve, or cylinder. Nevertheless, from the viewpoint of considerations such as ease of belt fabrication, short operation cycle time, and the mechanical strength of the fabricated joint, an ultrasonic welding process is preferably used to join the end marginal regions 12 and 14 of flexible electrophotographic imaging member sheet 10 into a seam 30 in the overlap region, as shown in FIG. 2, to form a seamed flexible electrophotographic imaging member belt 10. As illustrated in FIG. 2, the location of seam 30 is indicated by a dotted line. Seam 30 comprises two vertical portions joined by a horizontal portion. Thus, the midpoint of seam 30 may be represented by an imaginary centerline extending the length of seam 30 from one edge of belt 10 to the opposite edge, the imaginary centerline (not shown) running along the middle of the horizontal portion that joins the two vertical portions illustrated in FIG. 2. In other words, a plan view (not shown) of the horizontal portion of seam 30 would show a strip much like a two lane highway in which the centerline would be represented by the white divider line separating the two lanes, the two lanes comprising end marginal regions 12 and 14. The flexible electrophotographic imaging member 10 is thus transformed from a sheet of electrophotographic imaging member material as illustrated in FIG. 1 into a continuous electrophotographic imaging member belt as illustrated in FIG. 2. The flexible electrophotographic imaging member 10 has a first major exterior surface or side 32 and a second major exterior surface or side 34 on the opposite side. The seam 30 joins the flexible electrophotographic imaging member 10 so that the bottom surface 34 (generally including at least one layer immediately above) at and/or near the first end marginal region 12 is integral with the top surface 32 (generally including at east one layer immediately below) at and/or near the second end marginal region 14.

A preferred heat/pressure joining means includes ultrasonic welding to transform the sheet of photoconductive imaging material into a photoreceptor belt. The belt can be fabricated by ultrasonic welding of the overlapped opposite end regions of a sheet. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Upon completion of welding the overlap region of the flexible electrophotographic imaging member sheet into a seam 30 using ultrasonic seam welding technique, the overlap region is transformed into an overlapping and abutting region as illustrated in FIG. 2. Within the overlapping and abutting region, the portions of the flexible electrophotographic imaging member 10, which once formed the end marginal regions 12 and 14, are joined by the seam 30 such that the once end marginal regions 12 and 14 are overlapping and abutting one another. The welded seam 30 contains upper and lower splashings 68 and 70 at each end thereof as illustrated in FIG. 2. The splashings 68 and 70 are formed in the process of joining the end marginal regions 12 and 14 together. Molten material is necessarily ejected from either side of the overlap region to facilitate direct support layer 26 to support layer fusing and results in the formation of the splashings 68 and 70. The upper splashing 68 is formed and positioned above the overlapping end marginal region 14 abutting the top surface 32 and adjacent to and abutting the overlapping end marginal region 12. The lower splashing 70 is formed and positioned below the overlapping end marginal region 12 abutting bottom surface 34 and adjacent to and abutting the overlapping end marginal region 14. The splashings 68 and 70 extend beyond the sides and the edges of the seam 30 in the overlap region of the welded flexible electrophotographic imaging member 10. The extension of the splashings 68 and 70 beyond the sides and the edges of the seam 30 is undesirable for many machines such as electrophotographic copiers, duplicators and copiers that require precise edge positioning of a flexible electrophotographic imaging member 10 during machine operation. Generally, the extension of the splashings 68 and 70 at the belt edges of the flexible electrophotographic imaging member 10 are removed by a notching operation.

In alternative embodiments, the ends of a sheet material can be joined by alternative methods. For example, rather than overlapping the opposing ends, the opposing ends can be provided in any other method available in the art, including puzzle cuts, mirror-shaped geometric cuts, and the like. However, in embodiments, overlapping symmetrical miter-cut ends are desired. Such joining of the opposing ends provides a more uniform seam, particularly in embodiments where the material comprises two or more layers that are desirably matched up to each other. Such precise matching of layers is not as well obtained in embodiments such as that shown in FIGS. 1 and 2; however, such methods can be suitably used for single-layer materials.

Figure 3:
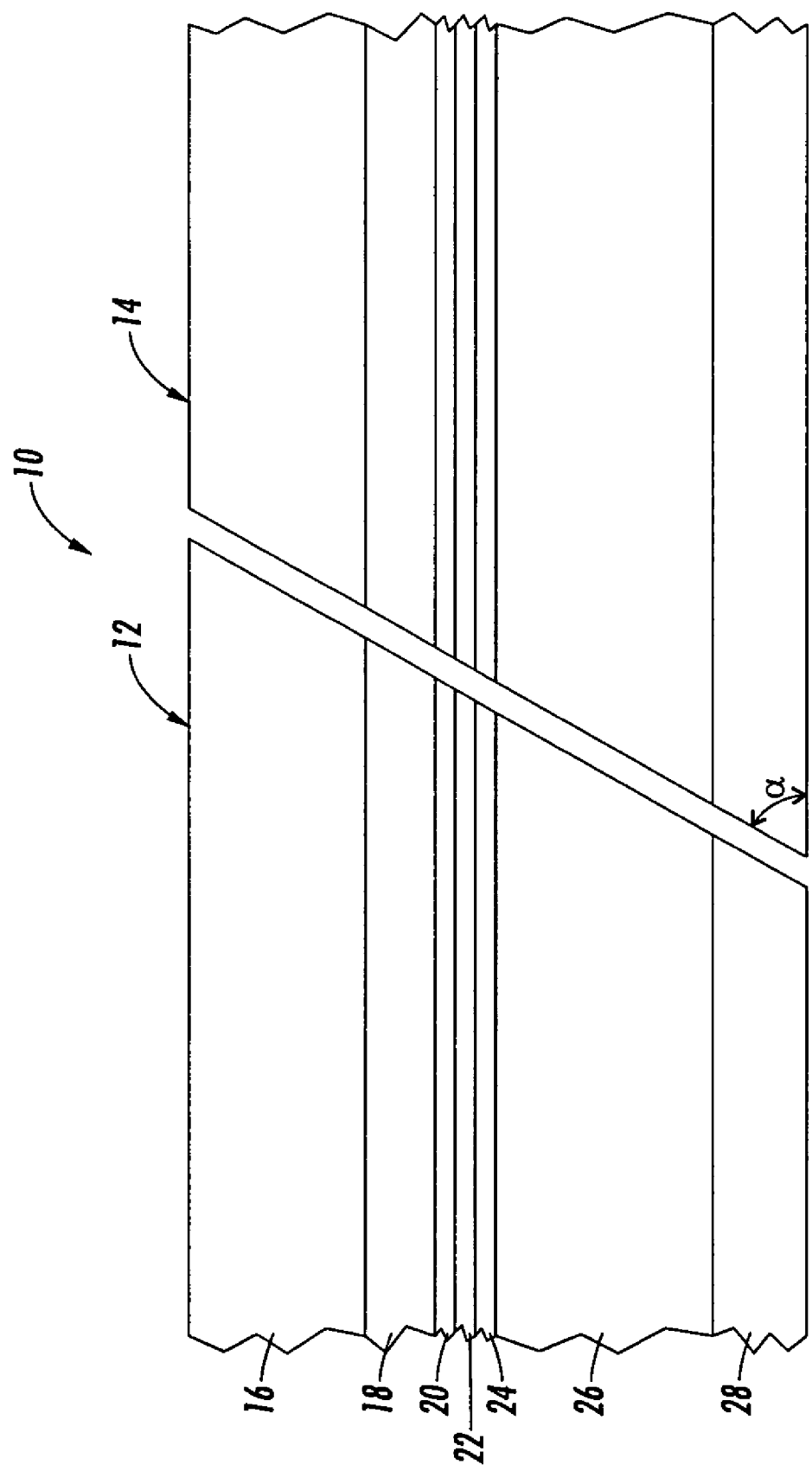
FIG. 3 illustrates a schematic partial cross-sectional view of a flexible sheet of material with opposite miter-cut ends abutted.

Referring to FIG. 3, for example, the opposing ends can be provided as symmetrical miter-cut ends, which overlap each other. Thus, in FIG. 3 there is illustrated a flexible electrophotographic imaging member 10 in the form of a sheet having a first end marginal region 12 abutting a second end marginal region 14 to form an overlap region ready for a seam forming operation. The flexible electrophotographic member 10 can be utilized within an electrophotographic imaging device and may be a single film substrate member or a member having a film substrate layer combined with one or more additional coating layers. At least one of the coating layers comprises a film forming binder.

Where miter-cut ends are provided on the abutting surfaces 12,14, the angle of the cut, a, can be any suitable angle, as desired. For example, suitable angles, a, can be selected to be from about 20 to about 70°, such as from about 30 to about 60°. An angle, a, of from about 40 to about 50°, such as about 45°, can also be used. Of course, angles outside these ranges can also be used, as desired. Furthermore, although the cut in FIG. 3 is shown as a smooth cut of angle a, the seam can also be formed as a step cut, interlocking notches, and the like.

Figure 4:
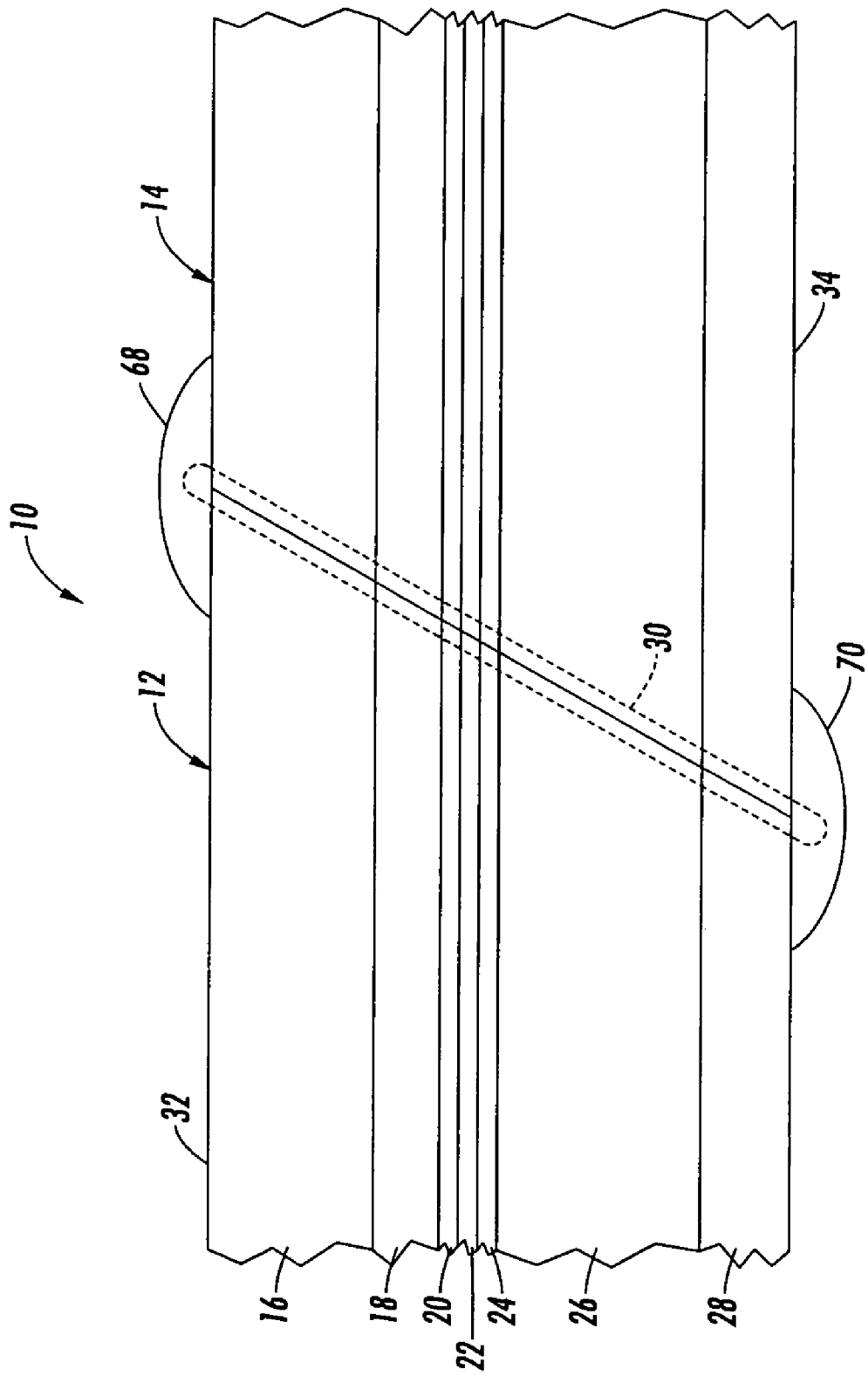
FIG. 4 shows a schematic partial cross-sectional view of a flexible belt derived from the sheet illustrated in FIG. 3 after ultrasonic seam welding.

A welding process, such as ultrasonic welding, is preferably used to join the end marginal regions 12 and 14 of flexible electrophotographic imaging member sheet 10 into a seam 30 in the overlap region, as shown in FIG. 4, to form a seamed flexible electrophotographic imaging member belt 10. As illustrated in FIG. 4, the location of seam 30 is indicated by a dotted line. Seam 30 comprises a single angular portion extending from the bottom of the sheet to the top of the sheet. Thus, the midpoint of seam 30 may be represented by an imaginary centerline extending the length of seam 30 from one edge of belt 10 to the opposite edge. The flexible electrophotographic imaging member 10 is thus transformed from a sheet of electrophotographic imaging member material as illustrated in FIG. 3 into a continuous electrophotographic imaging member belt as illustrated in FIG. 4. The flexible electrophotographic imaging member 10 has a first major exterior surface or side 32 and a second major exterior surface or side 34 on the opposite side. The seam 30 joins the flexible electrophotographic imaging member 10 so that the respective layers on the marginal ends 12 and 14, generally match up with each other, forming a continuous belt.

Upon completion of welding the overlap region of the flexible electrophotographic imaging member sheet into a seam 30 using ultrasonic seam welding technique, the overlap region is transformed into an overlapping and abutting region as illustrated in FIG. 4. Within the overlapping and abutting region, the portions of the flexible electrophotographic imaging member 10, which once formed the end marginal regions 12 and 14, are joined by the seam 30 such that the once end marginal regions 12 and 14 are overlapping and abutting one another. The welded seam 30 contains upper and lower splashings 68 and 70 at each end thereof as illustrated in FIG. 4. The splashings 68 and 70 are formed in the process of joining the end marginal regions 12 and 14 together. Molten material is necessarily ejected from either side of the overlap region to facilitate direct support layer 26 to support layer fusing and results in the formation of the splashings 68 and 70. The upper splashing 68 is formed and positioned above the overlapping end marginal region 14 abutting the top surface 32 and adjacent to and abutting the overlapping end marginal region 12. The lower splashing 70 is formed and positioned below the overlapping end marginal region 12 abutting bottom surface 34 and adjacent to and abutting the overlapping end marginal region 14. The splashings 68 and 70 generally form bumps or protrusions above and below the seam area 30 of the welded flexible electrophotographic imaging member 10. The bumps or protrusions of the splashings 68 and 70 are undesirable for many machines such as electrophotographic copiers, duplicators and copiers that require precise edge positioning of a flexible electrophotographic imaging member 10 during machine operation. For example, the existence of the bumps or protrusions can create image defects if that area of the belt is used in an imaging operation, or that area of the belt must be avoided in imaging operations, requiring additional system control.

In order to provide a smooth seamed belt, it is desired that the bumps or protrusions, or splashings, are removed or at least their size and impact minimized. In embodiments, the splashings removal is conducted using a super finishing or fine polishing process, which provides a smooth surface.

In embodiments of the disclosure, the ends of the flexible belt to be joined at the seam are preferably overlapped and abutted together, prior to ultrasonic welding. The overlapping and abutment can be conducted, for example, by simply laying one end over the other without any intervening materials (such as adhesive or glue), or the layers can be temporarily adhered together with adhesive or glue prior to the ultrasonic welding. An advantage, however, in embodiments, is that no adhesive or glue is required, thereby allowing a more homogeneous seam to be formed where the opposing edges are welded together without an intervening material.

Figure 5:
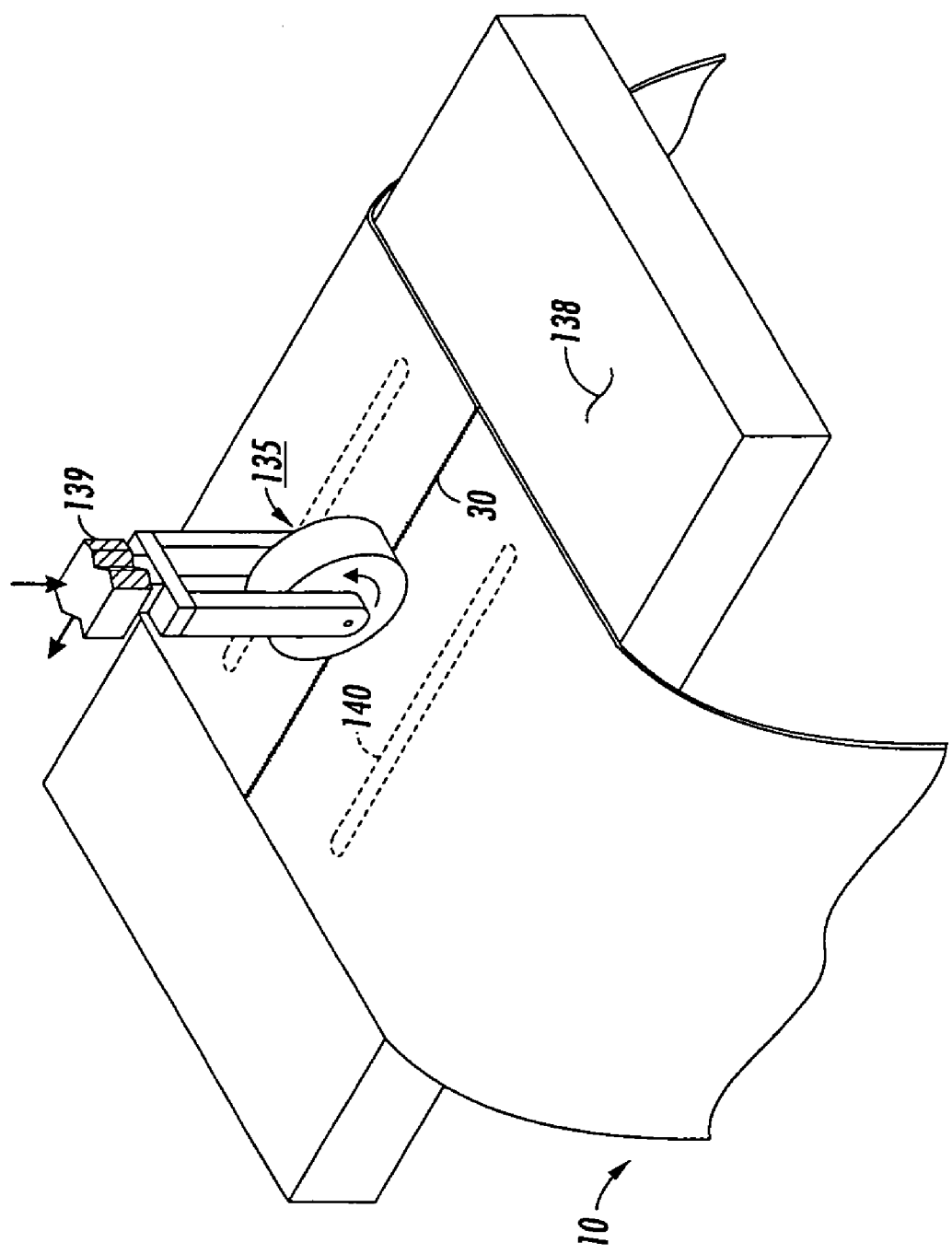
FIG. 5 shows an isometric schematic view of a seamed flexible electrophotographic imaging member belt in which the seam is positioned onto and held down over the flat supporting surface of an elongated support member while subjected to fine polishing.

An embodiment of the process and apparatus of the present disclosure, illustrated in FIG. 5, utilizes a polishing wheel assembly 135 to provide localized fine polishing of only a small area of seam 30 to provide seam area surface smoothing and high protrusions elimination results while the seam 30 of imaging member belt 10 is positioned and vacuum held down on the flat smooth supporting surface of support member 138.

A narrow vacuum channel 140 (e.g. having a width of about 0.06 inch (1.5 millimeters)) can be used on each side of the support member to vacuum hold the belt 10 down against the flat supporting surface of support member 138. The vacuum channel 140 are about 25 millimeters apart and extend, on each side of seam 30, along the support member 138 to about the full width of the belt 10. The upper ends of the vacuum channels 140 are open and the lower ends are connected by a suitable device such as a valved flexible hose (not shown) leading to any suitable vacuum source. After belt 10 is placed onto support member 138, manually or by any suitable conventional robotic device, the initially closed valve on the flexible hose to the vacuum source is opened to suck belt 10 against the upper flat smooth surface of support member 138 to hold belt 10 immobile on support member 138 during seam smoothing. If desired, a plurality of holes of any suitable shape (e.g. round, oval, square, and the like) may be used instead of or in addition to the channels 140. The number and size of the holes should be sufficient to hold the belt 10 against the support member. The size of the channels and holes should be small enough to avoid distortion of the belt during the seam area polishing process. The resistance of the belt to distortion when suction is applied depends on the beam strength of the specific belt employed, which in turn depends upon the specific materials in and thickness of the layers in the belt 10. The support member 138 may comprise any suitable hard material. Typical materials include, for example, hard plastic, having a smooth and polished surface. Preferably, support member 138 is metallic.

In another embodiment, the support member 138 is a curved or notched (such as V-notched) surface, such that the seam area is located at a height greater than the remainder or at least adjoining surfaces of the flexible belt. Such a curved surface allows the super finishing tool to more accurately process the seam area, without unnecessarily processing adjoining areas.

The polishing wheel or paper can be any suitable polishing wheel used in the art for fine polishing operations, and can be used in conjunction with any suitable abrasive or polishing composition. In embodiments, the polishing wheel, or at least an outer surface of the polishing wheel that contacts the seam region is coated with a thin abhesive or low surface energy coating to prevent imaging layer material from adhering to the surface of the polishing wheel. when seam treatment is carried out. Any suitable abhesive or low surface energy material may be employed. Typical abhesive or low surface energy coating materials include, for example, polytetrafluoroethylene (PTFE, or Teflon), fluoro-hydrocarbon polymer, silicone, polyimide, and the like. A thin Teflon coating is preferred in some embodiments because it promotes ease of release and prevents imaging member material from sticking to the surface of the polishing wheel when the polishing wheel contacts the seam 30.

The polishing wheel may be hot or cold and may be of any suitable material. Typical materials include, for example, hard plastic, metal, composites, and the like. A metal wheel having a smooth polished surface is preferred. The polishing wheel assembly preferably has a circumferential surface that is flat and parallel to the flat surface of the supporting member 138 when the surface profile is viewed in a direction perpendicular to the axis of the wheel. This circumferential surface of the polishing wheel preferably provides a uniform linear pressure suitable to effect the desired surface polishing, without damaging underlying layers of the belt.

Figure 6:
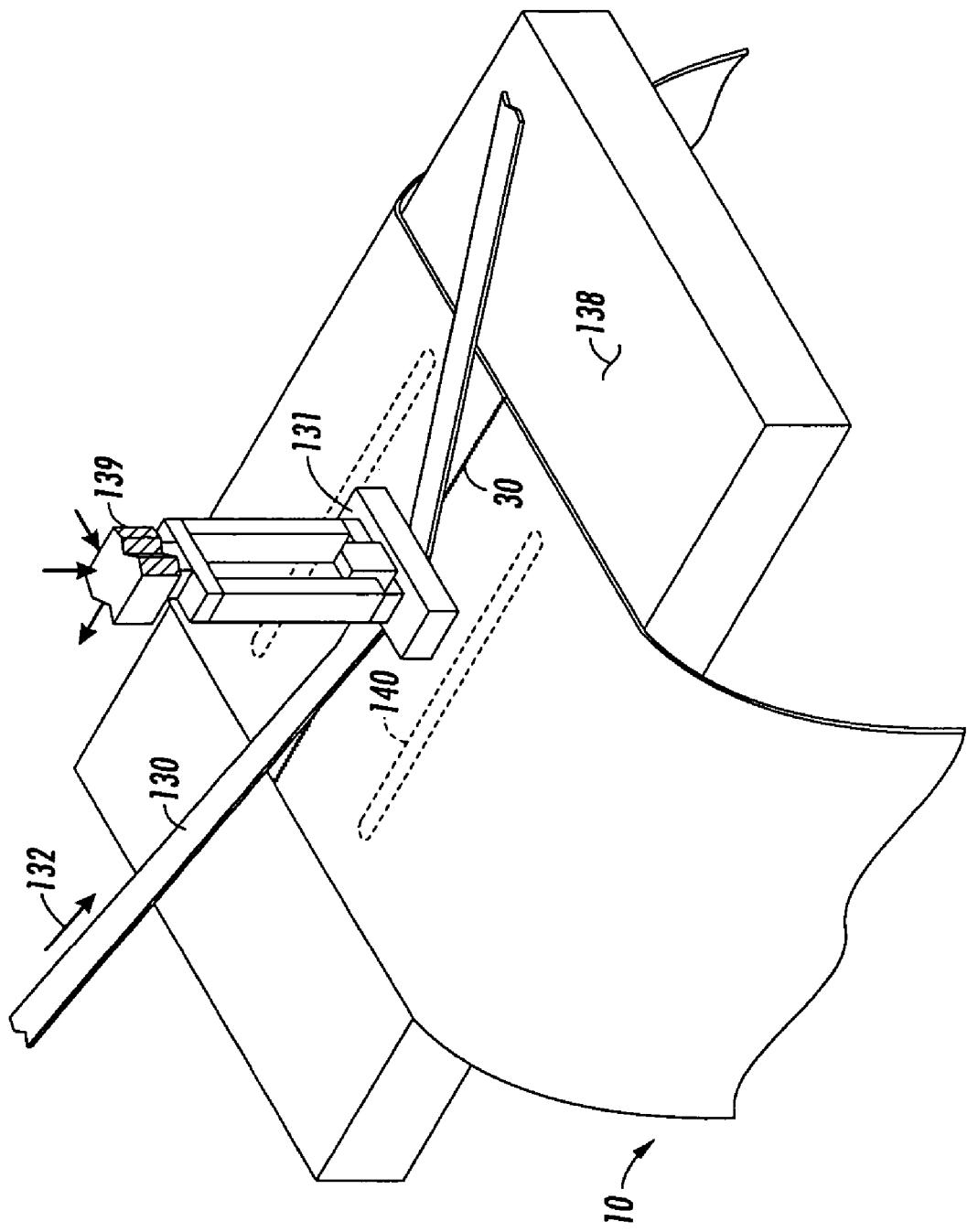
FIG. 6 shows an isometric schematic view of an alternative super finishing system.

Although the polishing wheel assembly 135 is described above as including a polishing wheel, the super finishing tool is not limited to a wheel, and other tools assemblies can be advantageously used. For example, in place of a polishing wheel, tools such as grinding stones, vibrating, oscillating or orbiting sanders, and the like can be used. For example, an embodiment as shown in FIG. 6, uses an oscillating sander 131, which oscillates from side-to-side across the seam, and uses a fine sandpaper or equivalent polishing or grinding paper or cloth 130 to super finish the seam. In this embodiment, a strip, roll or the like of the sandpaper 130 can be used, where the sandpaper 130 is slowly fed across the oscillating sander in the direction of arrow 132, thus providing new grinding media to the seam area while removing grinding media that may become clogged, used, or the like. Furthermore, in such a setup, the sander can be provided in a manner that slowly moves along the length of the seam, as shown in the Figures, or the sander can be provided as a semi- or full-length sander (not shown), which extends along a greater length of the seam to provide more efficient processing. Other variations will also be apparent.

If desired, the polishing assembly 135,131 can also be supplied with coolant (not shown), to reduce heat generation in the super finishing process. Thus, for example, a coolant such as water, air, or the like can be supplied to the seam area during the super finishing process, to remove heat generated in that process and thus to avoid heat damage to the flexible belt.

The polishing wheel 135 may be moved manually or automatically and substantially continuously or incrementally to polish the seam 30. Any suitable horizontally reciprocateable carriage system 139 may be utilized to effect transverse motion of the wheel of wheel assembly 135 over the seam 30 across the full width of the belt 10. In other words, the horizontally reciprocateable carriage system 139 transports wheel assembly 135 to continuously or incrementally apply a polishing pressure against seam 30 along the entire length of the seam from one edge of the imaging belt 10 to the other. Alternatively, support member 138 with seam 30 may be moved substantially continuously or incrementally either manually or automatically while the polishing wheel assembly is held immobile. Moreover, if desired, both the support member 138 with seam 30 of belt 10 and wheel assembly 135 may be moved simultaneously and relatively with respect to each other to yield the desired seam treatment results. Any suitable means such as a horizontally reciprocateable carriage system may be used to move wheel assembly 135. Typical horizontally reciprocateable carriage systems include, for example, ball screw, two way acting air cylinder, lead screw and motor combination, belt or chain drive slide system, and the like. The process of this disclosure flattens all protrusions on the welded seam and reduces the thickness in the seam region.

Once one side of the belt is processed, the belt may be turned over so that the opposite side of the seam can be polished or super finished. Alternatively, both sides of the seam can be polished or super finished at the same time, by appropriate modification of the support 138 and polishing assemblies. In embodiments, it is desired to super finish both sides of the belt, to remove the splashing, or bumps and protrusions, from both sides. In this manner, a belt can be provided that has a thickness in the seam area that is the same as, or substantially the same as, the thickness of the belt in other areas.

Still further, if desired, the splashing, or bumps and protrusions, on one side of the belt can be retained. For example, where the splashing on an inner surface of the belt would not effect imaging properties of the belt or would not interfere with mechanical systems in an imaging device, the inner splashing can be left in place. Preferably, however, at least the splashing, or bumps and protrusions, on the outer, imaging side, of the belt are removed by the described super finishing processing.

For processing a flexible imaging member belt having a slanted seam, the polishing wheel may be set to precisely track the slanted seam when traversing the entire belt width. However, it is preferred in embodiments that the belt itself is cocked and adjusted such that the seam is positioned, without skewing, on the flat support member 138.

An advantage of the flexible belts formed according to the disclosure is that they can be made essentially invisible to the imaging process. That is, where the flexible belts are super finished as described, the entire surface of the flexible belt can be imaged in an imaging process, rather than having to skip over the seam area. In this manner, because the seam area does not provide visible image defects, the flexible belt can be considered to be "seamless" in that the seam area functions in the same manner as the other areas of the flexible belt.

The flexible belts formed according to the disclosure can be used in any suitable electrographic, including electrostatographic and electrophotographic, imaging apparatus to form images. For example, any suitable electrophotographic charging, exposure, development, transfer, fixing and cleaning techniques may be utilized to form and develop electrostatic latent images on the imaging member of this disclosure. Thus, for example, conventional light lens or laser exposure systems may be used to form the electrostatic latent image. The resulting electrostatic latent image may be developed by suitable conventional development techniques such as magnetic brush, cascade, powder cloud, and the like. In embodiments where the flexible belt is an imaging member, the imaging member can be selected to be either positive or negative charging imaging members.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

A conventional intermediate image transfer belt is formed from a sheet including a single homogeneous layer of carbon loaded Kapton (a polyamide). The sheet is cut into two equal sized strips. The opposite ends of each strip are miter cut at an angle of 5 degrees, and the opposite edges are overlapped. The overlapped edges are ultrasonically welded together by traversing a welding horn at the height of 0.002 inches above the strips, at a speed of 1 in./sec, and with a downward horn force of 4 lbs. This provides two similar endless seamed belts.

One of the thus-formed belts is subjected to surface fine polishing. In this process, a super finisher comes into the seam at a set distance, and begins oscillating from side to side in the direction of the seam, as new sandpaper (5 micron 3M paper) is slowly advanced across the sander. The whole assembly is traversed perpendicularly to the seam. The result is an endless belt having a substantially smooth surface, even over the seam location. The belt is used in an imaging process, and it is found that the seam area of the belt can be imaged without producing visible print defects. The seam area is found to be substantially invisible to the imaging process.

Comparative Example 1

The second belt formed in Example 1 above is not subjected to the described surface fine polishing, but is used as is. The result is an endless belt having a substantially smooth surface, except that bumps or protrusions are found on either side of the belt at the seam location. The belt is used in an imaging process, and it is found that the seam area of the belt produces visible print defects, in the form of a fine line.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for post treatment of an ultrasonically welded seamed flexible imaging member belt comprising:
   providing a flexible belt having an outer surface, an inner surface, parallel edges and a welded seam extending from one parallel edge to the other parallel edge, the belt seam comprising a seam region comprising an overlap of two oppositely miter cut edges, and two adjacent splashings formed around the seam;
   contacting the seam with abrasive and a super finishing tool; and
   super finishing the seam to smooth the surface of the seam, eliminate high protrusions on the seam, and to remove at least the splashing on the outer surface of the belt.

2. The process of claim 1, wherein the miter cut edges form an angle of from about 3 to about 70° with respect to a plane of the outer and inner surfaces of the flexible belt.

3. The process of claim 1, wherein the miter cut edges form an angle of from about 5 to about 60° with respect to a plane of the outer and inner surfaces of the flexible belt.

4. The process of claim 1, wherein the miter cut edges form an angle of from about 45° with respect to a plane of the outer and inner surfaces of the flexible belt.

5. The process of claim 1, wherein the flexible belt consists of a single layer of substantially homogeneous material.

6. The process of claim 1, wherein the flexible belt comprises at least two different layers having at least different compositions or different properties.

7. The process of claim 1, wherein the flexible belt is an imaging member belt for use in an electrostatographic imaging device.

8. The process of claim 7, wherein the seam of the flexible belt is invisible to the imaging process.

9. The process of claim 1, wherein the seam region comprises the overlap of two oppositely miter cut edges without an adhesive material therebetween.

10. The process of claim 1, further comprising super finishing the seam to remove the splashing on the inner surface of the belt.

11. The process of claim 1, wherein the contacting comprises sanding the seam area with an oscillating sander.

12. A process for forming a seamed flexible belt, comprising:
  providing a flexible belt having an outer surface, an inner surface, a first set of parallel side edges and a second set of parallel side edges; wherein the first set of parallel side edges are oppositely miter cut edges;
  abutting and overlapping the oppositely miter cut first set of parallel side edges to form a seam;
  ultrasonically welding the seam, forming a welded seam extending between the second set of parallel side edges and adjacent splashings formed around the welded seam;
  contacting the seam with abrasive and a super finishing tool; and
  super finishing the seam to smooth the surface of the seam, eliminate high protrusions on the seam, and to remove at least the splashing on the outer surface of the belt.

13. The process of claim 12, wherein the miter cut edges form an angle of from about 20 to about 70° with respect to a plane of the outer and inner surfaces of the flexible belt.

14. The process of claim 12, wherein the miter cut edges form an angle of from about 30 to about 60° with respect to a plane of the outer and inner surfaces of the flexible belt.

15. The process of claim 12, wherein the miter cut edges form an angle of from about 45° with respect to a plane of the outer and inner surfaces of the flexible belt.

16. The process of claim 12, wherein the flexible belt consists of a single layer of substantially homogeneous material.

17. The process of claim 12, wherein the flexible belt comprises at least two different layers having at least different compositions or different properties.

18. The process of claim 12, wherein the flexible belt is an imaging member belt for use in an electrostatographic imaging device.

19. The process of claim 18, wherein the seam of the flexible belt is invisible to the imaging process.

20. The process of claim 12, wherein the seamed flexible belt is selected from the group consisting of a photoreceptor, an electroreceptor, and an intermediate image transfer belt.

21. The process of claim 12, wherein the seam comprises the overlap of the oppositely miter cut first set of parallel sides without an adhesive material therebetween.

22. The process of claim 12, further comprising super finishing the seam to remove the splashing on the inner surface of the belt.

23. An electrographic image development device, comprising at least one seamed flexible belt formed by the method of claim 12.

\* \* \* \* \*